US011972893B2

(12) United States Patent
Liang et al.

(10) Patent No.: US 11,972,893 B2
(45) Date of Patent: Apr. 30, 2024

(54) SHIELDED COIL ASSEMBLIES AND METHODS FOR DRY-TYPE TRANSFORMERS

(71) Applicants: Siemens Energy Global GmbH & Co. KG, Munich (DE); Hainan Jinpan Smart Technology Co. Ltd, Haikou (CN)

(72) Inventors: Haoning Liang, Beijing (CN); Martin Alsina Navarro, Sao Paulo (BR); Andre Luiz Moreno, Varzea Paulista (BR); Ming Zhang, Hubei (CN); Yong Guo, Hainan (CN)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 611 days.

(21) Appl. No.: 15/734,193

(22) PCT Filed: Jun. 7, 2018

(86) PCT No.: PCT/CN2018/090317
§ 371 (c)(1),
(2) Date: Dec. 1, 2020

(87) PCT Pub. No.: WO2019/232763
PCT Pub. Date: Dec. 12, 2019

(65) Prior Publication Data
US 2021/0151246 A1 May 20, 2021

(51) Int. Cl.
*H01F 27/36* (2006.01)
*H01F 27/28* (2006.01)
(Continued)

(52) U.S. Cl.
CPC ....... *H01F 27/2885* (2013.01); *H01F 27/327* (2013.01); *H01F 27/36* (2013.01);
(Continued)

(58) Field of Classification Search
CPC .................................................. H01F 27/2885
(Continued)

(56) References Cited

U.S. PATENT DOCUMENTS 4,586,015 A 4/1986 Takahara et al.
8,085,121 B2 12/2011 Hanov
(Continued)

FOREIGN PATENT DOCUMENTS

CA 2285806 A1 4/2000
CN 101512690 A 8/2009
(Continued)

OTHER PUBLICATIONS

English translation of EP2075806 (Year: 2007).*
(Continued)

*Primary Examiner* — Ronald Hinson

(57) ABSTRACT

In some embodiments, a shielded coil assembly is provided that includes (1) a coil having an outer surface, an inner surface, an upper end surface and a lower end surface and a first insulating material formed over the outer surface, inner surface, upper end surface and lower end surface of the coil; and (2) a conductive shield comprising a conductive paint applied along the first insulating material so that the conductive paint extends over at least a portion of each of the outer surface, inner surface, upper end surface, and lower end surface of the coil. In one or more embodiments, a dry-type transformer may be formed using the shielded coil assembly. Numerous other embodiments are provided.

8 Claims, 8 Drawing Sheets

(51) Int. Cl.
*H01F 27/32* (2006.01)
*H01F 41/12* (2006.01)

(52) U.S. Cl.
CPC ......... *H01F 27/361* (2020.08); *H01F 27/363* (2020.08); *H01F 27/366* (2020.08); *H01F 41/127* (2013.01); *H01F 2027/328* (2013.01); *H01F 2027/329* (2013.01)

(58) Field of Classification Search
USPC .................................................. 336/84, 84 R
See application file for complete search history.

(56) References Cited

U.S. PATENT DOCUMENTS

| | | | | |
|---|---|---|---|---|
| 8,520,357 | B2 | 8/2013 | Reisinger et al. | |
| 8,614,614 | B2 | 12/2013 | Navarro et al. | |
| 9,355,772 | B2 | 5/2016 | Navarro | |
| 2008/0061915 | A1 | 3/2008 | Godbey | |
| 2011/0146063 | A1 | 6/2011 | Park et al. | |
| 2014/0176292 | A1* | 6/2014 | Ortiz | H01F 27/288 336/84 C |
| 2015/0109090 | A1* | 4/2015 | Patel | H01F 27/327 336/84 C |
| 2018/0075963 | A1 | 3/2018 | Veenstra et al. | |
| 2018/0211761 | A1* | 7/2018 | Zhang | H01F 27/363 |

FOREIGN PATENT DOCUMENTS

| | | | |
|---|---|---|---|
| CN | 101842860 | A | 9/2010 |
| CN | 107039159 | A | 8/2017 |
| CN | 206460860 | U | 9/2017 |
| JP | 2008187015 | A | 8/2008 |
| WO | 2017140482 | A1 | 8/2017 |

OTHER PUBLICATIONS

PCT International Search Report mailed Mar. 6, 2019 corresponding to PCT Application PCT/CN2018/090317 filed Jun. 7, 2018.

* cited by examiner

SHIELDED COIL ASSEMBLIES AND METHODS FOR DRY-TYPE TRANSFORMERS

FIELD

This application relates to transformers used for electric power distribution, and more particularly to shielding for coils in dry-type transformers.

BACKGROUND

Transformers are employed to increase or decrease voltage levels during electrical power distribution. To transmit electrical power over a long distance, a transformer may be used to raise the voltage and reduce the current of the power being transmitted. Reduced current levels reduce resistive losses from the electrical cables used to transmit that power. When the power is to be consumed, a transformer may be employed to reduce the voltage level and increase the current of the power to a level specified by the end user.

One type of transformer that may be employed is a dry-type, submersible transformer, as described, for example, in U.S. Pat. No. 8,614,614. Such transformers may be employed underground, in cities, etc., and may be designed to withstand harsh environments that may expose the transformers to humidity, water, pollution, and the like. Improved apparatus, assemblies, and methods for submersible and other dry-type transformers are desired.

SUMMARY

In some embodiments, a shielded coil assembly is provided that includes (1) a coil having an outer surface, an inner surface, an upper end surface and a lower end surface and a first insulating material formed over the outer surface, inner surface, upper end surface and lower end surface of the coil; and (2) a conductive shield comprising a conductive paint applied along the first insulating material so that the conductive paint extends over at least a portion of each of the outer surface, inner surface, upper end surface, and lower end surface of the coil. In one or more embodiments, a dry-type transformer may be formed using the shielded coil assembly.

In some embodiments, a shielded coil assembly is provided that includes (1) a coil having an outer surface, an inner surface, an upper end surface and a lower end surface and a first insulating material formed over the outer surface, inner surface, upper end surface and lower end surface of the coil; and (2) a conductive shield having (a) a conductive mesh applied along the first insulating material so that the conductive mesh extends over at least a portion of the outer surface, inner surface, upper end surface, and lower end surface of the coil; and a semi-conductive paint formed over the conductive mesh. The conductive mesh and semi-conductive paint form a composite structure over at least a portion of each of the outer surface, the inner surface, the upper end surface, and the lower end surface of the coil. In one or more embodiments, a dry-type transformer may be formed using the shielded coil assembly.

In some embodiments, a method of forming a coil assembly is provided that includes (1) providing a coil having an outer surface, an inner surface, an upper end surface and a lower end surface; (2) encasing the coil in a first insulating material; and (3) forming a conductive shield over the coil by applying a conductive paint so that the conductive paint extends over at least a portion of each of the outer surface, inner surface, upper end surface, and lower end surface of the coil.

In some embodiments, a method of forming a coil assembly is provided that includes (1) providing a coil having an outer surface, an inner surface, an upper end surface and a lower end surface; (2) encasing the coil in a first insulating material; and (3) forming a conductive shield over the coil by (a) applying a conductive mesh along the first insulating material so that the conductive mesh extends over at least a portion of the outer surface, inner surface, upper end surface, and lower end surface of the coil; and (b) applying a semi-conductive paint over the conductive mesh so that the conductive mesh and semi-conductive paint form a composite structure over at least a portion of each of the outer surface, inner surface, upper end surface, and lower end surface of the coil.

Still other aspects, features, and advantages of this disclosure may be readily apparent from the following detailed description illustrated by a number of example embodiments and implementations. This disclosure may also be capable of other and different embodiments, and its several details may be modified in various respects. Accordingly, the drawings and descriptions are to be regarded as illustrative in nature, and not as restrictive. The drawings are not necessarily drawn to scale.

DETAILED DESCRIPTION

Figure 1A:
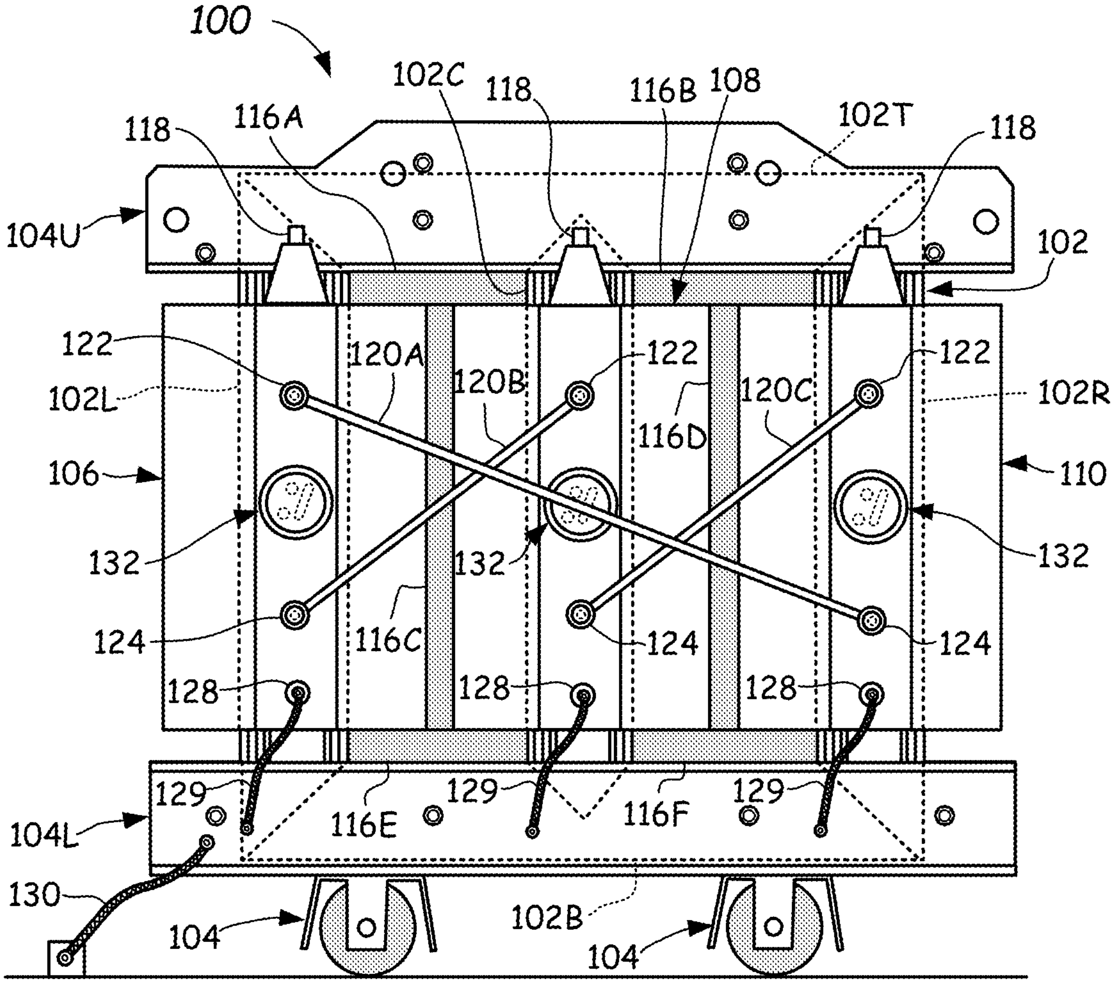
FIG. 1A illustrates a front plan view of a submersible dry-type transformer in accordance with embodiments provided herein.

As mentioned above, a submersible dry-type transformer may be employed underground and/or in other harsh environments that may expose the transformer to water, humidity, pollutants, etc. When a transformer is exposed to wet, humid or otherwise hostile environments, the transformer may be susceptible to corrosion. For proper operation, as well as safety considerations, such a transformer should be grounded to prevent transmission of dangerous electrical voltages to the surrounding environment and/or to personnel in the vicinity of the transformer. This is particularly important when the transformer is submerged.

In accordance with one or more embodiments described herein, shielded coil assemblies are provided for use in dry-type transformers, as are methods for forming such shielded coil assemblies. The shielded coil assemblies have shielding that may be grounded so transformers using the shielded coil assemblies are free from static charge and/or have no dangerous voltages levels on exterior surfaces of the transformers. The shielding may be embedded in a protective layer, such as an epoxy resin, so that the shielding will not corrode if transformers employing the shielded coil assemblies are exposed to a wet or otherwise corrosive environment.

In some embodiments, a shielded coil assembly may include an inner coil and an outer coil, with shielding provided for at least the outer coil of the shielded coil assembly. For example, the outer coil may have an outer surface, an inner surface, an upper end surface and a lower end surface having an insulating material, such as an epoxy resin, formed thereon (e.g., on all surfaces). A conductive shield including a conductive paint may be applied to the insulated outer coil and extend over at least a portion of each of the outer surface, inner surface, upper end surface, and lower end surface of the outer coil. To prevent loop current formation, a gap in the conductive paint may be provided in some embodiments. A ground lead or cable may be coupled to the conductive shield, and the conductive shield may be embedded within another insulating material (e.g., an epoxy resin). In one or more embodiments, a semi-conductive paint may be provided beneath the conductive paint. For example, in some embodiments, the entire insulated outer coil may be coated with a semi-conductive paint prior to the formation of the conductive paint layer. In such embodiments, the conductive paint may be formed as a continuous layer (e.g., with the exception of a gap region employed to reduce/prevent loop currents), or the conductive paint may be provided in only some regions (e.g., by painting stripes or a grid pattern with the conductive paint). Numerous other embodiments are provided. A dry-type transformer may be formed using the shielded coil assembly in some embodiments.

In accordance with other embodiments, the conductive shield may be formed by wrapping an insulated outer coil with conductive mesh and applying a semi-conductive paint over the (and/or between) the conductive mesh. For example, the conductive mesh may be applied along the insulated outer coil so that the conductive mesh extends over at least a portion of the outer surface, the inner surface, the upper end surface, and the lower end surface of the outer coil. A gap region may be formed in the conductive mesh to reduce/prevent loop currents. The semi-conductive paint may help hold the conductive mesh in place during subsequent processing (e.g., during encapsulation of the outer coil in a second insulating material, such as an epoxy resin). Because the semi-conductive paint may be applied over the conductive mesh, as well as in any openings in the conductive mesh, the conductive mesh and semi-conductive paint may form a composite structure over at least a portion of each of the outer surface, inner surface, upper end surface, and lower end surface of the outer coil. A ground lead or cable may be coupled to the conductive shield. In one or more embodiments, a dry-type transformer may be formed using the shielded coil assembly.

FIG. 1A is a front plan view of a dry-type transformer 100 in accordance with embodiments provided herein. The dry-type transformer 100 shown is a three-phase transformer, but in other embodiments, transformers with a different number of phases may be employed (e.g., one, two, four, five, etc.). “Dry-type transformer” as used herein means a transformer that includes high and low voltage coils that are not submerged in an oil bath or other similar fluid contained within an enclosure. Such dry-type transformers 100 have significant advantages, in that they do not utilize oil and may run cooler via cooling by air or water (when submerged).

By way of example, the dry-type transformer 100 may include a core assembly 102 (shown in phantom) mounted between an upper frame portion 104U and lower frame portion 104L. In one or more embodiments, insulating sheets (not shown) may be provided to insulate the sides of the core assembly 102 from the respective upper and lower frames 104U, 104L, while in other embodiments such insulating sheets (not shown) may not be used. In some embodiments, core assembly 102 may be formed from multiple laminations of a magnetic material. Example magnetic materials include iron, steel, amorphous steel or other amorphous magnetically permeable metals, silicon-steel alloy, carbonyl iron, ferrite ceramics, and/or combinations of the above materials, or the like. In some embodiments, laminated ferromagnetic metal materials having high cobalt content may be used. Other suitable magnetic materials may be used.

As shown, core assembly 102 may include multiple interconnected pieces and may include vertical core columns or regions 102L, 102C, and 102R (each shown in phantom). Vertical core columns 102L, 102C, and 102R may be assembled with top and bottom core members 102T, 102B (shown in phantom). Construction may include step-laps between respective components of the core assembly 102. Construction of the core assembly 102 may be as is shown in U.S. Pat. No. 8,212,645, for example. Other configurations of the core assembly 102 may be used. In some embodiments, within transformer 100, each core column 102L, 102C, and 102R may be surrounded by a coil assembly, namely coil assemblies 106, 108, 110.

Figure 1B:
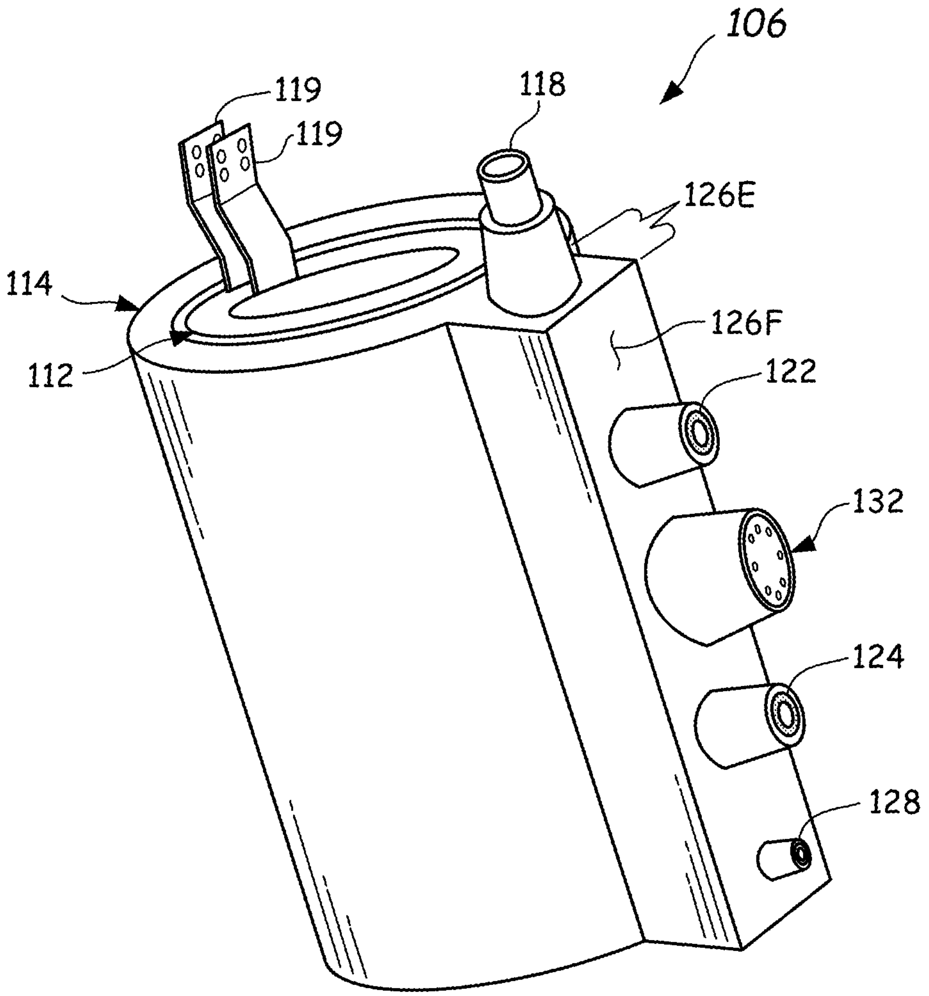
FIG. 1B illustrates a perspective view of a coil assembly in accordance with embodiments provided herein.

FIG. 1B illustrates a perspective view of coil assembly 106. Coil assembly 106 is shown and described herein by way of example, and coil assemblies 108, 110 may be identical or substantially identical thereto. The coil assembly 106 includes a low-voltage inner coil 112 and a high-voltage outer coil 114, which may be concentric with the low-voltage inner coil 112. Low-voltage inner coil 112 may be electrically isolated from the core assembly 102 and also from the high-voltage outer coil 114. For example, low-voltage inner coil 112 may be surrounded by an insulating material such as a molded resin. Likewise, high-voltage outer coil 114 may include a multi-stage insulating material (e.g., resin) provided in multiple sequential molding processes, as will be described fully herein. Example insulating materials may include any suitable solid insulation, such as an epoxy, polyurethane, polyester, silicone, and the like.

Referring again to FIG. 1A, the coil assemblies 106, 108, 110 and core assembly 102 may be separated by insulating sheets 116A-116F and others (not shown) as described in U.S. Pat. No. 8,614,614 entitled "Submersible Dry Transformer." Insulating sheets 116A-116F collectively operate to seal the plane of core openings or "windows" between core columns 102L, 102C and 102R of the core assembly 102. Sealing the core windows blocks passage of a liquid, and formation of conductive spirals, around core columns 102L, 102C and 120R if core assembly 102 is submerged in a liquid, as described in U.S. Pat. No. 8,614,614. Insulating sheets 116A-116F may be any suitable insulation material, such as a resin with glass fibers.

Each of the coil assemblies 106, 108, 110 of the transformer 100 may be provided with high voltage terminals 118 that in one embodiment may be positioned at a top front of the respective coil assemblies 106, 108, 110. Low voltage terminals 119 of the low voltage inner coil 112 (FIG. 1B) may be provided on a back side of the coil assemblies 106, 108, 110 or some other suitable location. For example, as shown in FIG. 1B, the high voltage terminals 118 may be located on a top front of a columnar front extension 126E of high voltage outer coil 114 and the low voltage terminals 119 may be located on a rear part of the low-voltage inner coil 112. However, the high voltage terminals 118 and low voltage terminals 119 could be located elsewhere. The high voltage terminals 118 provide electrical power connections to the high-voltage outer coils 114 of the respective coil assemblies 106, 108, 110. Connectors (not shown), such as sealed plug-in connectors, may be provided to facilitate sealed connection of high voltage terminals 118 to electrical cables (not shown). Delta or Wye connections (not shown) or the like may be made with low voltage terminals 119. Other suitable sealed connections are possible.

The transformer 100 may also include delta connections 120A, 120B, and 120C (FIG. 1A) between the respective high-voltage outer coils 114 of the coil assemblies 106, 108, 110. Delta connections 120A, 120B, 120C may comprise shielded cables, for example. Each of the delta connections 120A, 120B, 120C may be made to an upper terminal 122 and a lower terminal 124 of the high-voltage outer coil 114 of each of the coil assemblies 106, 108, 110, as shown. The electrical connections may be sealed connections in some embodiments. The upper terminal 122 and lower terminal 124 may extend horizontally (as shown in FIG. 1B) from the columnar front extension 126E of high voltage outer coil 114. For example, the upper terminal 122 and lower terminal 124 may extend outwardly from a front face 126F of the columnar front extension 126E in some embodiments.

A tap changer assembly 132 may be included on each of the high-voltage outer coils 114. For example, the tap changer assembly 132 may be provided as an extension from a front of the high-voltage outer coil 114. More particularly, the tap changer assembly 132 may be, as shown in FIG. 1B, an extension from the columnar front extension 126E, and may be conical in shape in some embodiments.

The high-voltage outer coil 114 of each of the coil assemblies 106, 108, 110 may include a grounding terminal 128. Grounding conductors 129 (FIG. 1A), such as braided cables may connect between the respective grounding terminals 128 of the high-voltage outer coils 114 and the lower frame 104L, for example. A common grounding strap 130 may attach to the lower frame 104L and may provide an earth ground. The high-voltage outer coil 114 in each of the coil assemblies 106, 108, 110 includes a conductive shield to be described fully herein.

Figure 2A:
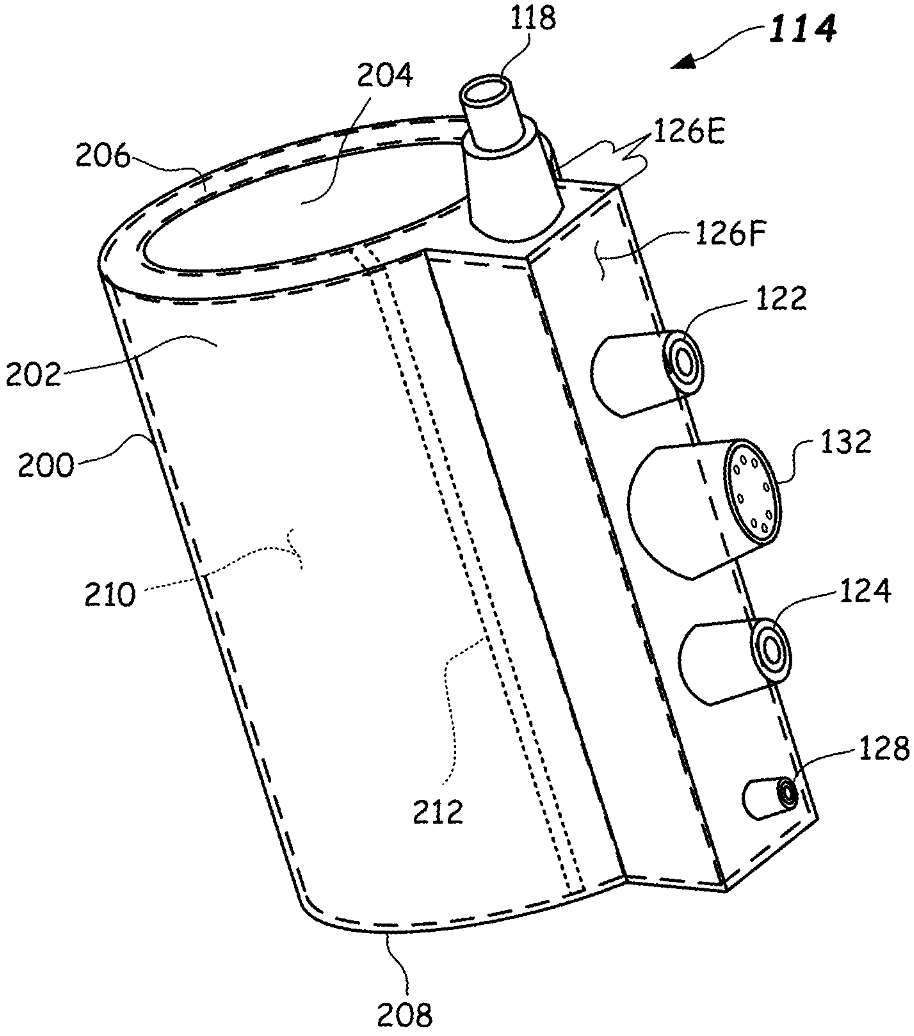
FIG. 2A illustrates a perspective view of a high-voltage outer coil in accordance with embodiments provided herein.

FIG. 2A illustrates a perspective view of a high-voltage outer coil 114 in accordance with embodiments provided herein. As discussed, each coil assembly 106, 108 and 110 includes a high-voltage outer coil 114. The high-voltage outer coil 114 includes an outer surface 202, an inner surface 204, an upper end surface 206 and a lower end surface 208 (e.g., each outer coil 114 of each coil assembly 106, 108 and 110 has an outer surface, an inner surface, an upper end surface and a lower end surface).

A conductive shield 210 (shown in phantom) may provide shielding to each of the surfaces of high-voltage outer coil 114 (as described further below). The conductive shield 210 may be highly electrically conductive so as to provide a low resistance path to ground for static charge and/or high voltage levels on the exterior surfaces of high-voltage outer coil 114. The grounding terminal 128 is connected to the conductive shield 210 thereby providing a means of electrically grounding the outer surface of high-voltage outer coil 114.

A loop separator region 212 may be included in the conductive shield 210 across each of the surfaces of high voltage outer coil 114 on which the conductive shield 210 is formed. As shown, the loop separator region 212 is formed as an interruption in the conductive shield 210 (beneath each of the outer surface 202, the inner surface 204, the upper end surface 206, and the lower end surface 208 of the high-voltage outer coil 114). The loop separator region 212 forms a continuous loop that is devoid of electrically-conductive material (e.g., an open loop). The inclusion of the loop separator region 212 in the conductive shield 210 helps prevent the creation of loop currents on the surfaces of the high-voltage outer coil 114.

In an aspect with broad applicability to transformers, an improved conductive shield 210 applied to each of the surfaces of the high-voltage outer coil 114 is provided.

Figure 2B:
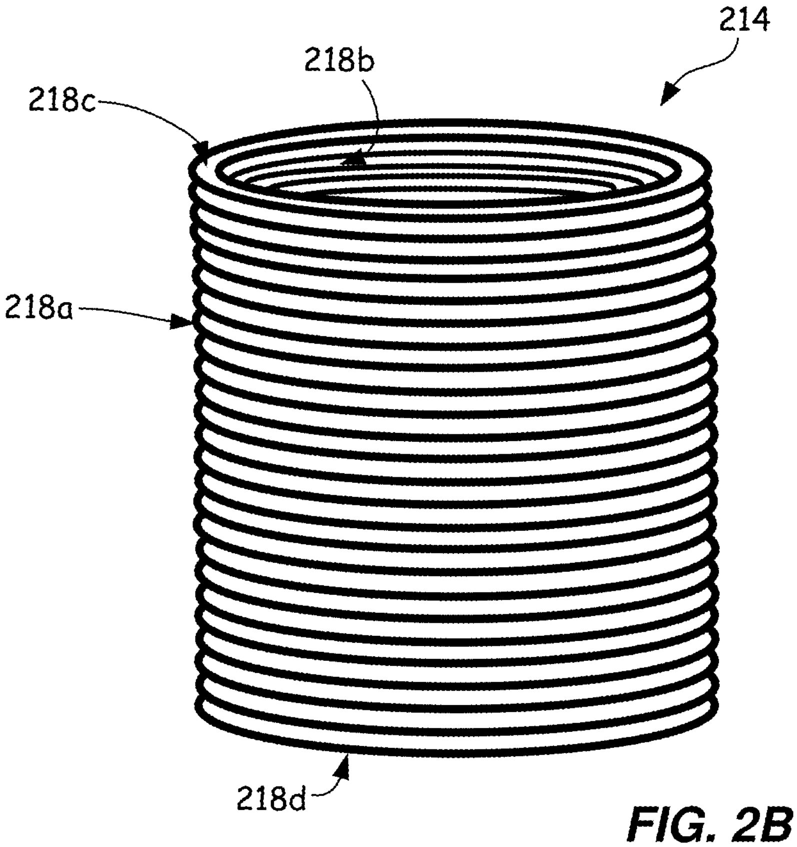
FIG. 2B illustrates a perspective view of a winding that may form part of a high-voltage outer coil in accordance with embodiments provided herein.
Figure 2C:
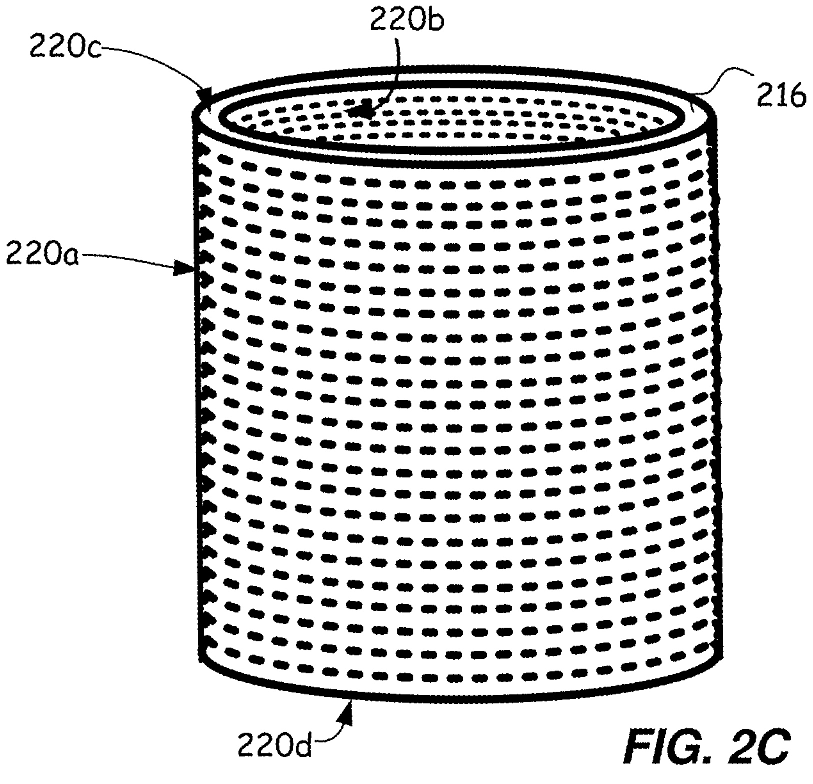
FIG. 2C illustrates a perspective view of the winding of FIG. 2B having a first insulating material formed over the winding in accordance with embodiments provided herein.
Figure 2D:
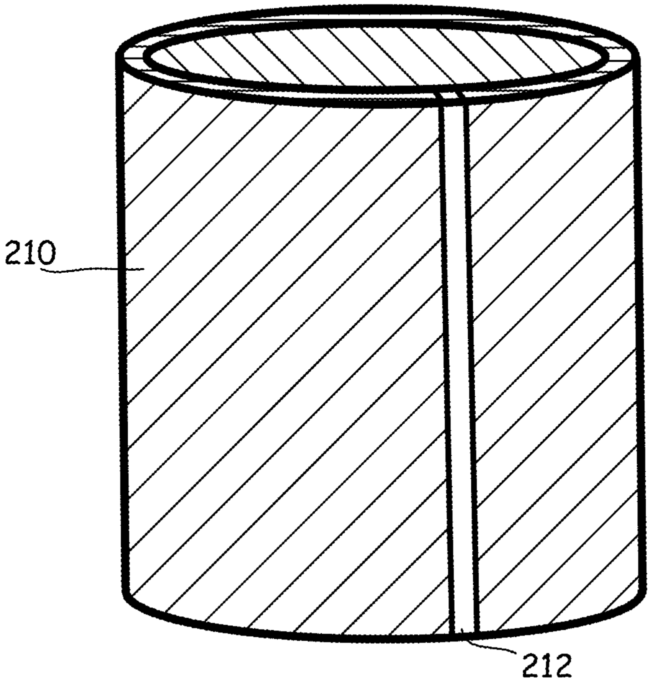
FIGS. 2D and 2E illustrates a top-side and bottom-side perspective view, respectively, of the winding of FIG. 2C having a conductive shield formed over the first insulating material of the winding in accordance with embodiments provided herein.
Figure 2E:
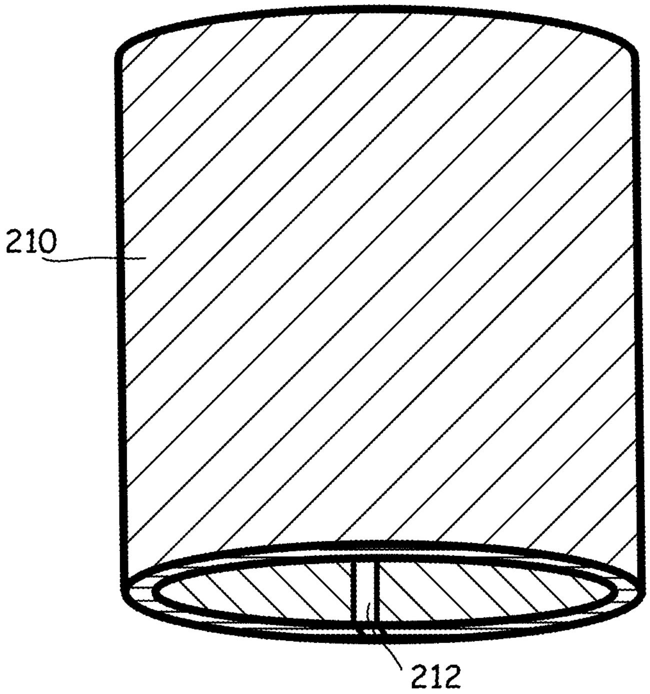

Formation of the conductive shield 210 of high-voltage outer coil 114 is illustrated in FIGS. 2B-2E. FIG. 2B illustrates a perspective view of a winding 214 that may form part of the high-voltage outer coil 114. FIG. 2C illustrates a perspective view of winding 214 having a first insulating material 216 formed over winding 214. FIGS. 2D and 2E illustrates a top-side and bottom-side perspective view, respectively, of winding 214 having conductive shield 210 formed over first insulating material 216.

With reference to FIG. 2B-2C, in some embodiments, to form the high-voltage outer coil 114 (FIG. 2A), an outer surface 218*a*, an inner surface 218*b*, an upper end surface 218*c* and a lower end surface 218*d* of winding 214 (shown in FIG. 2B) may be covered with first insulating material 216 (shown in FIG. 2C). An outer surface 220*a*, an inner surface 220*b*, an upper end surface 220*c* and a lower end surface 220*d* of first insulating material 216 (shown in FIG. 2C) may be covered with a conductive shield 210 (shown in FIGS. 2D and 2E). Loop separator region 212 may be included in conductive shield 210 across each of the surfaces comprising high voltage outer coil 114. As shown, the loop separator region 212 is formed as an interruption in the conductive shield 210 along each of the outer surface 220*a*, the inner surface 220*b*, the upper end surface 220*c*, and the lower end surface 220*d* of the first insulating material 216 of winding 214 of high-voltage outer coil 114. The loop separator region 212 forms a continuous loop along each of the surfaces comprising the first insulating material 216 of high-voltage outer coil 114, and that is devoid of electrically-conductive material. The inclusion of the loop separator region 212 in the conductive shield 210 helps prevent the creation of loop currents on the surfaces of high-voltage outer coil 114.

Figure 3A:
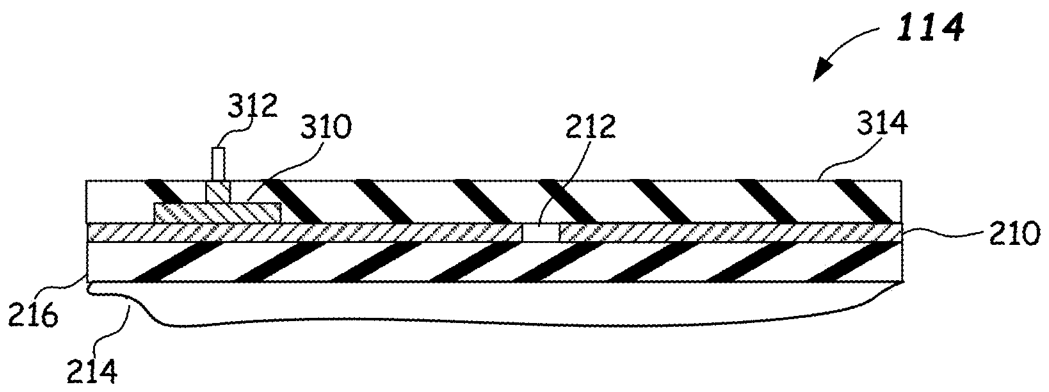
FIG. 3A illustrates a partial cross-sectional side view of a coil with an example embodiment of a conductive shield provided herein.
Figure 3B:
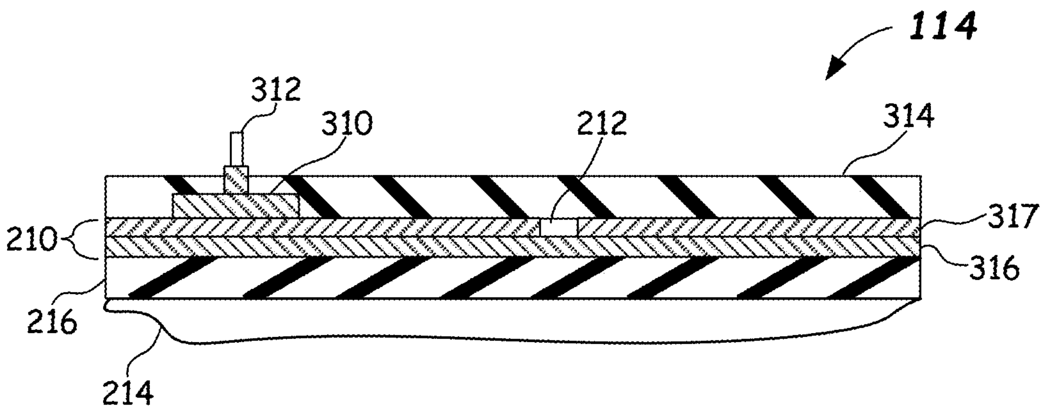
FIG. 3B illustrates a partial cross-sectional side view of a coil with an alternate example embodiment of a conductive shield provided herein.
Figure 3C:
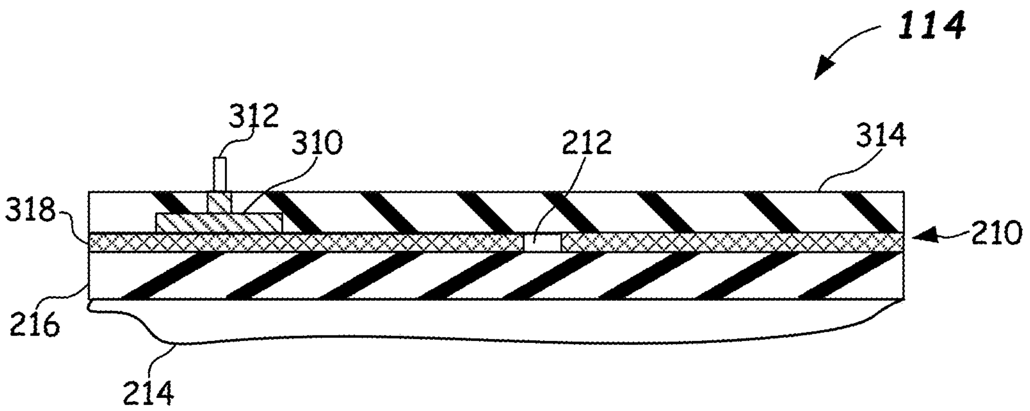
FIG. 3C illustrates a partial cross-sectional side view of a coil with another alternate example embodiment of a conductive shield provided herein.

Example conductive shields for high-voltage outer coil 114 are described below with reference to FIGS. 3A-3C. For convenience, only a portion of winding 214 is shown in FIGS. 3A-3C. It will be understood that conductive shields may provide shielding for most, if not all, surfaces of the high-voltage outer coil 114 in some embodiments.

FIG. 3A illustrates a partial cross-sectional side view of a portion of high-voltage outer coil 114 having a conductive shield in accordance with embodiments provided herein. With reference to FIG. 3A, winding 214 of high-voltage outer coil 114 is covered by the first insulating material 216. For example, winding 214 may be wound in a cylindrical shape, forming a winding structure having an outer surface 218*a*, inner surface 218*b*, upper end surface 218*c* and lower end surface 218*d* as shown in FIG. 2B. The first insulating material 216 may fully cover these surfaces as shown in FIG. 2C. The first insulating material 216 may be an epoxy resin, polyurethane, polyester, silicone, or the like. Other suitable insulating materials may be employed. Example resins include Aradur® HY 926 CH and/or Araldite® CY 5948 available from Huntsman Quimica Ltda. of Sao Paulo, Brazil. In some embodiments, the resin may be fiberglass reinforced. The thickness of the first insulating material 216 layer may be between 6-7 mm although other suitable thickness ranges may be used.

A conductive shield 210 is formed over the first insulating material 216. Specifically, the conductive shield 210 is formed over insulating material 216 on at least a portion of each surface comprising the high-voltage outer coil 114. For example, as shown in FIGS. 2C-2E, the conductive shield 210 may be formed over first insulating material 216 on at least a portion of each of the outer surface 220*a*, the inner surface 220*b*, the upper end surface 220*c* and the lower end surface 220*d* of first insulating material 216 of the high-voltage outer coil 114.

In some embodiments, the conductive shield 210 may be a conductive paint applied to the first insulating material 216. The conductive paint may be comprised of a conductive metal including one or more of copper, nickel, silver-coated copper, nickel-silver, and silver. Other suitable conductive paints may be used. In some embodiments, the conductive paint may have an electrical resistance between about 0.01 Ohm/sq in/mil to 1 Ohm/sq in/mil and/or have a thickness of between about 30 and 500 microns, and in some embodiments between about 30 and 150 microns, as applied, although other suitable resistances and/or thickness ranges may be used (wherein "sq in" is an abbreviation for "square inch" and "mil" is 0.001 inch). The conductive paint may be applied by any suitable process, such as brushing, rolling, spraying, and dipping. Moreover, a stencil or mask may be used to form a pattern on the first insulating material 216, the pattern including a grid pattern, a striped pattern or any other suitable pattern. In some embodiments, the application of the conductive shield 210 may be done in a manner that ensures its electrical continuity across each of the surfaces of the high-voltage outer coil 114 (e.g., each of the outer surface 220*a*, the inner surface 220*b*, the upper end surface 220*c* and the lower end surface 220*d* of first insulating material 216 of the high-voltage outer coil 114).

In some embodiments, the conductive shield 210 may include a loop separator region 212. The loop separator region 212 may be formed by an interruption in the conductive shield 210 on each of the outer surface 220*a*, the inner surface 220*b*, the upper end surface 220*c* and the lower end surface 220*d* of first insulating material 216 of the high-voltage outer coil 114 (FIGS. 2C-2E). In some embodiments, the interruption may be between 4-6 mm wide, although other suitable width ranges may be used. The loop separator region 212 forms a continuous loop that is devoid of any conductive paint (e.g., an open loop) across all the surfaces comprising the high-voltage outer coil 114 (extending across each of the outer surface 220*a*, the inner surface 220*b*, the upper end surface 220*c* and the lower end surface 220*d* of first insulating material 216 of the high-voltage outer coil 114 (FIGS. 2C-2E)). The loop separator region 212 may be provided in one form or another whether the conductive paint has been applied as a continuous sheet or as a pattern.

In some embodiments, a ground connection 310 may be coupled to the conductive shield 210. For example, in some embodiments, the ground connection 310 may be a metal plate in direct contact with the conductive shield 210 or a conductive tape formed over or under the conductive shield 210. When the conductive shield 210 comprises conductive paint, at least a portion of the ground connection 310 may be placed on top of or underneath the conductive paint, for example. Other ground connections may be used. A ground terminal 312 may be attached to the ground connection 310 to which an external ground lead or cable may be attached. Ground connection 310 and/or ground terminal 312 may be formed from any suitable material such as copper, brass, aluminum or the like. In some embodiments, one or more of high voltage terminal 118, upper terminal 122, lower terminal 124, ground terminal 128, and/or tap changer assembly 132 may be masked during application of the conductive shield 210.

A second insulating material 314 may be applied over the conductive shield 210 and the ground connection 310. As with the first insulating material 216, the insulating material may be an epoxy resin, polyurethane, polyester, silicone, or the like. Other suitable insulating materials may be employed. Whichever insulating material is employed, the second insulating material 314 may protect the conductive shield 210 from humidity, water, pollution, and the like.

FIG. 3B illustrates a partial cross-sectional side view of a coil with an alternate example embodiment of a conductive shield provided herein. With reference to FIG. 3B, winding 214 of high-voltage outer coil 114 is covered by the first insulating material 216. For example, a continuous layer of first insulating material 216 may full cover winding 214. The first insulating material 216 may cover the outer surface 218*a*, inner surface 218*b*, upper end surface 218*c* and lower end surface 218 of winding 214 of high-voltage outer coil 114 (FIGS. 2B-2C). The first insulating material 216 may be an epoxy resin, polyurethane, polyester, silicone, or the like. Other suitable insulating materials may be employed. Example resins include Aradur® HY 926 CH and/or Araldite® CY 5948 available from Huntsman Quimica Ltda. of Sao Paulo, Brazil. In some embodiments, the resin may be fiberglass reinforced. The thickness of the first insulating material 216 may be between 6-7 mm although other suitable thickness ranges may be used.

In the embodiment of FIG. 3B, conductive shield 210 is formed from a layer of semi-conductive paint 316 and a layer of conductive paint 317. For example, a layer of semi-conductive paint 316 may be formed over the first insulating material 216. The semi-conductive paint 316 may be applied to the first insulating material 216 over all of the surfaces comprising the high-voltage outer coil 114. For example, the semi-conductive paint 316 may be applied over insulating material 216 on each of the outer surface 220*a*, the inner surface 220*b*, the upper end surface 220*c* and the lower end surface 220*d* of first insulating material 216 of the high-voltage outer coil 114 (FIG. 2C). The layer of semi-conductive paint 316 may provide for a uniform electric field and/or voltage potential across the outer surface 202, the inner surface 204, the upper end surface 206 and the lower end surface 208 of the high-voltage outer coil 114 (FIG. 2A).

Semi-conductive paint 316 may be similar in composition to conductive paint 317 in that it may be comprised of a conductive metal including one or more of copper, nickel, silver-coated copper, nickel-silver, and silver. Other suitable semi-conductive paint types may be used. Semi-conductive paint 316 differs from conductive paint 317 in that it generally encompasses a higher electrical resistance range. In some embodiments, the semi-conductive paint 316 may have an electrical resistance between about 1 kilo-ohm/sq in/mil to 10 kilo-ohm/sq in/mil and/or a thickness of between about 10 and 500 microns, and in some embodiments between about 10 and 50 microns, as applied, although other suitable electrical resistances and/or thickness ranges may be used.

After formation of the layer of semi-conductive paint 316, conductive paint 317 is formed over the layer of semi-conductive paint 316. For example, the conductive paint 317 may be formed over the semi-conductive paint 316 that was formed on first insulating material 216, with the conductive paint 317 covering at least a portion of each of the outer surface 220*a*, the inner surface 220*b*, the upper end surface 220*c* and the lower end surface 220*d* of first insulating material 216 that was covered with semi-conductive paint 316. Conductive shield 210, which includes conductive paint 317 and underlying semi-conductive paint 316, is therefore formed on at least a portion of each of the outer surface 220*a*, the inner surface 220*b*, the upper end surface 220*c* and the lower end surface 220*d* of first insulating material 216 of high-voltage outer coil 114 (as shown in FIGS. 2C-2E).

Conductive paint 317 may be comprised of a conductive metal including one or more of copper, nickel, silver-coated copper, nickel-silver, and silver. Other suitable conductive paints may be used. In some embodiments, the conductive paint 317 may have an electrical resistance between about 0.01 Ohm/sq in/mil to 1 Ohm/sq in/mil and/or have a thickness of between about 30 and 500 microns, and in some embodiments between about 30 and 150 microns, as applied, although other suitable resistance and/or thickness ranges may be used. The semi-conductive paint 316 and/or conductive paint 317 may be applied by any suitable process, such as brushing, rolling, spraying, and dipping. In some embodiments, a stencil or mask may be used to form a pattern of conductive paint on the layer of semi-conductive paint 316 formed over the first insulating material 216, the pattern including a grid pattern, a striped pattern or any other suitable pattern. In some embodiments, the application of the conductive shield 210 may be done in a manner that ensures its electrical continuity across each of the surfaces of the high-voltage outer coil 114 (e.g., across each of the outer surface 220*a*, the inner surface 220*b*, the upper end surface 220*c* and the lower end surface 220*d* of first insulating material 216 of the high-voltage outer coil 114).

In some embodiments, the conductive shield 210 may include a loop separator region 212. The loop separator region 212 is formed as an interruption in the conductive paint 317 portion of conductive shield 210 on each of the outer surface 220*a*, the inner surface 220*b*, the upper end surface 220*c* and the lower end surface 220*d* of first insulating material 216 of the high-voltage outer coil 114 (FIGS. 2C-2E). The interruption in the layer of conductive paint 317 may be between 4-6 mm wide although other suitable width ranges may be used. The loop separator region 212 forms a continuous loop that is devoid of any conductive paint 317 across all the surfaces comprising the high-voltage outer coil 114 (extending across each of the outer surface 220*a*, the inner surface 220*b*, the upper end surface 220*c* and the lower end surface 220*d* of first insulating material 216 of the high-voltage outer coil 114 (FIGS. 2C-2E) and exposing the underlying semi-conductive paint 316 in the gap region). The loop separator region 212 may be present in one form or another whether the conductive paint 317 has been applied as a continuous layer or as a pattern. In one or more embodiments, conductive paint 317 may have a resistance that is low enough to allow the formation of (measurable) current loops on the surfaces of the high-voltage outer coil 114 if loop separator region 212 is not employed. Such current loops may cause heating of and damage to the coil assembly.

The semi-conductive paint 316 exposed in the loop separator region 212 in conductive paint 317 helps prevent leakage of an electric field through the loop separator region 212 during operation of the high-voltage outer coil 114. Moreover, the higher electrical resistance range of the layer of the semi-conductive paint 316 helps prevent the formation of a ground loop within the layer of semi-conductive paint 316 (even though the semi-conductive paint 316 may be present in the loop separator region 212). In one or more embodiments, semi-conductive paint 316 may have a resistance that is high enough to prevent the formation of (measurable) current loops on the surfaces of the high-voltage outer coil 114.

In some embodiments, a ground connection 310 may be coupled to the conductive shield 210. For example, in some embodiments, the ground connection 310 may be a metal plate in direct contact with the conductive shield 210 or a conductive tape formed over or under the conductive shield 210. When the conductive shield 210 comprises conductive paint, at least a portion of the ground connection 310 may be placed on top of or underneath the conductive paint (e.g., on top of semi-conductive paint 316), for example. Other ground connections may be used. A ground terminal 312 may be attached to the ground connection 310 to which an external ground lead or cable may be attached. In some embodiments, one or more of high voltage terminal 118, upper terminal 122, lower terminal 124, ground terminal 128, and/or tap changer assembly 132 may be masked during application of the conductive shield 210.

A second insulating material 314 may be applied over the conductive shield 210 and the ground connection 310. As with the first insulating material 216, the insulating material may be an epoxy resin, polyurethane, polyester, silicone, or the like. Other suitable insulating materials may be employed. Whichever insulating material is employed, the second insulating material 314 may protect the conductive shield 210 from humidity, water, pollution, and the like.

As mentioned, the combination of the conductive shield 210 and the ground connection 310 provides for a low resistance path to ground for static charge and/or high voltages distributed across the exterior surfaces of the high-voltage outer coil 114.

FIG. 3C illustrates a partial cross-sectional side view of a coil with another alternate example embodiment of a conductive shield provided herein. With reference to FIG. 3C, winding 214 of high-voltage outer coil 114 is covered by the first insulating material 216. For example, a continuous layer of first insulating material 216 may full cover winding 214. The first insulating material 216 may cover the outer surface 218*a*, inner surface 218*b*, upper end surface 218*c* and lower end surface 218*d* of winding 214 of high-voltage outer coil 114 (FIGS. 2B-2C). The first insulating material 216 may be an epoxy resin, polyurethane, polyester, silicone, or the like. Other suitable insulating materials may be employed. Example resins include Aradur® HY 926 CH and/or Araldite® CY 5948 available from Huntsman Quimica Ltda. of Sao Paulo, Brazil. In some embodiments, the resin may be fiberglass reinforced. The thickness of the first insulating material 216 may be between 6-7 mm although other suitable thickness ranges may be used.

In the embodiment of FIG. 3C, conductive shield 210 is formed from a conductive mesh applied along the first insulating material 216 and a semi-conductive paint formed over the conductive mesh. With reference to FIG. 3C, a conductive mesh 318 is placed over the first insulating material 216. For example, conductive mesh 318 may be applied over insulating material 216 on each of the outer surface 220*a*, the inner surface 220*b*, the upper end surface 220*c* and the lower end surface 220*d* of first insulating material 216 of the high-voltage outer coil 114 (FIG. 2C). As mentioned, the first insulating material 216 may be an epoxy resin, polyurethane, polyester, silicone, or the like. Other insulating materials may be employed. In some embodiments, the resin may be fiberglass reinforced. The thickness of the first insulating material 216 layer may be between 6-7 mm, although other suitable thickness ranges may be used.

Conductive mesh 318 may be comprised of a conductive material formed into a pattern (e.g., a grid or screen). Example conductive materials for the conductive mesh 318 include conductive metals such as one or more of copper, nickel, silver-coated copper, nickel-silver, silver or the like, although other types of conductive meshes may be used. In some embodiments, conductive mesh 318 may have an electrical resistance of between about 0.01 to 1 Ohm/sq cm, although other suitable electrical resistance ranges may be used.

In some embodiments, semi-conductive paint (not separately shown) may be used to hold conductive mesh 318 in place and/or to fill the gaps regions of conductive mesh 318. The semi-conductive paint applied to the conductive mesh 318 may be comprised of a conductive metal including one or more of coal powder, copper, nickel, silver-coated copper, nickel-silver, and silver, although other suitable types of semi-conductive paint may be used. In some embodiments, the semi-conductive paint may have an electrical resistance of between about 1 kilo-ohm/sq in/mil to 10 kilo-ohm/sq in/mil, although other suitable electrical resistance ranges may be used.

Once the conductive mesh 318 has been positioned on the first insulating material 216, semi-conductive paint may be applied to the conductive mesh 318 by any suitable process, such as brushing, rolling, spraying, and dipping. The composite structure of conductive mesh material and semi-conductive paint serves as conductive shield 210. In some embodiments, the composite structure may have a thickness of between about 100 and 500 microns, although other suitable thickness ranges may be used.

In some embodiments, the conductive shield 210 may include a loop separator region 212. The loop separator region 212 may be formed as an interruption in the conductive shield 210 on each of the outer surface 220*a*, the inner surface 220*b*, the upper end surface 220*c* and the lower end surface 220*d* of first insulating material 216 of the high-voltage outer coil 114 (FIGS. 2C-2E). In some embodiments, the interruption may be between 4-6 mm wide, although other suitable width ranges may be used. The loop separator region 212 forms a continuous loop that is devoid of any conductive mesh across all the surfaces comprising the high-voltage outer coil 114 (extending through each of the outer surface 220*a*, the inner surface 220*b*, the upper end surface 220*c* and the lower end surface 220*d* of first insulating material 216 of the high-voltage outer coil 114 (FIGS. 2C-2E)). The loop separator region 212 may be provided in one form or another whether the conductive mesh has been applied as a continuous sheet or as a series of mesh pieces. The loop separator region 212 may include semi-conductive paint in one or more embodiments.

In some embodiments, a ground connection 310 may be coupled to the conductive shield 210. For example, in some embodiments, the ground connection 310 may be a metal plate in direct contact with the conductive shield 210 or a conductive tape formed over or under the conductive shield 210. When the conductive shield 210 comprises conductive mesh with semi-conductive paint, at least a portion of the ground connection 310 may be placed on top of or underneath the conductive mesh, for example. Other ground connections may be used. A ground terminal 312 may be attached to the ground connection 310 to which an external ground lead or cable may be attached. In some embodiments, one or more of high voltage terminal 118, upper terminal 122, lower terminal 124, ground terminal 128, and/or tap changer assembly 132 may be masked during application of the conductive shield 210.

A second insulating material 314 may be applied over the conductive shield 210 and the ground connection 310. As with the first insulating material 216, the insulating material may be an epoxy resin, polyurethane, polyester, silicone, or the like. Other suitable insulating materials may be employed. Whichever insulating material is employed, the second insulating material 314 may protect the conductive shield 210 from humidity, water, pollution, and the like.

Figure 4:
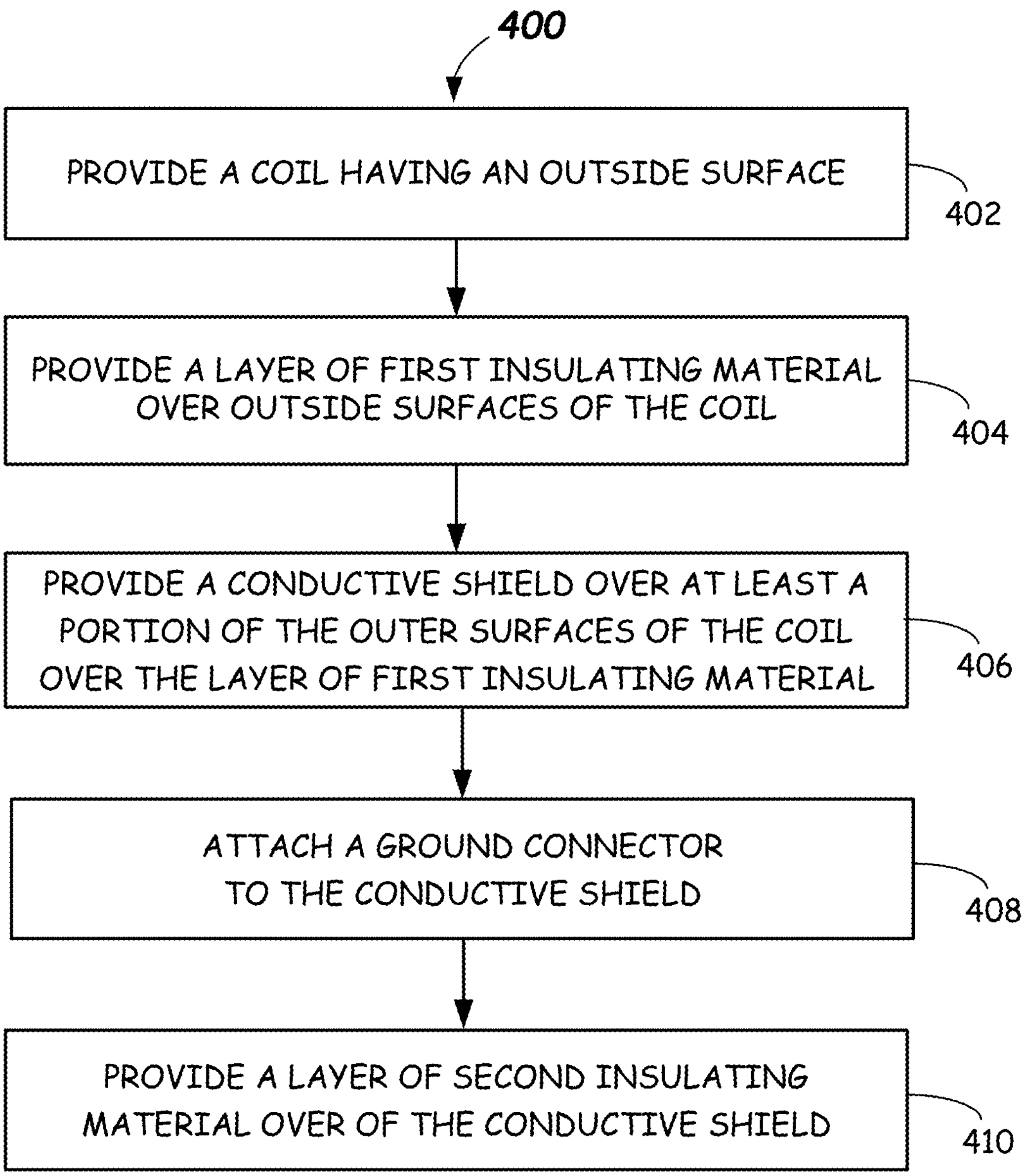
FIG. 4 illustrates a flowchart of a method of manufacturing a high-voltage outer coil in accordance with the embodiments provided herein.

Now referring to FIG. 4, in some embodiments, a method 400 of forming a high-voltage outer coil (e.g. high-voltage outer coil 114) of a dry-type transformer (e.g., transformer 100) is provided. The method 400 includes, in 402, providing a high-voltage outer coil (e.g., winding 214 of FIG. 2B) having an outside surface. The outside surface including an outer surface, an inner surface, an upper end surface and a lower end surface (e.g., outer surface 218*a*, inner surface 218*b*, upper end surface 218*c* and lower end surface 218*d*).

The method 400 further includes, in 404, providing the outer surfaces of the coil (e.g., winding 214) with a layer of a first insulating material (e.g., first insulating material 216 of FIG. 2C). The layer of first insulating material may fully encapsulate or encase the outer surface, the inner surface, the upper surface and the lower surface of the coil. The insulating material, for example, may be an epoxy resin, polyurethane, polyester, silicone, or the like.

Further, the method 400 includes, in 406, providing a conductive shield (e.g., conductive shield 210) over at least a portion of each of the outer surface, the inner surface, the upper end surface and the lower end surface of the coil. The conductive shield may be a conductive paint (e.g., FIG. 3A), a combination of conductive paint overlying semi-conductive paint (e.g., FIG. 3B), or a composite structure formed from conductive mesh and semi-conductive paint (e.g., FIG. 3C). The conductive shield may include a break (e.g., loop separator region 212) which is a continuous loop-shaped separation in the conductive shield across each of the surfaces of the coil. This separation may prevent the formation of loop currents within the conductive shield.

Moreover, the method 400 includes, in 408, providing a ground connection (e.g., grounding connection 310) coupled to the conductive shield. In some embodiments, the ground connection may be a metal plate in direct contact with the conductive shield, a conductive tape formed over or under the conductive shield or the like. A ground terminal may be attached to the ground connection, and an external ground lead or cable may be attached thereto.

Additionally, the method 400 further includes, in 410, providing the coil with a layer of a second insulating material on the outside surfaces of the coil (e.g., second insulating material 314). The layer of second insulating material may fully encapsulate or encase the conductive shield on the surfaces of the coil. As with the first insulating material, the second insulating material may be an epoxy resin, polyurethane, polyester, silicone, or the like.

The embodiments described with reference to FIGS. 1A-4 describe use of a conductive shield 210 and/or a loop separator region 212 with a high-voltage outer coil 114. In some embodiments, a conductive shield 210 (with or without a loop separator region 212) similarly may be provided for the low-voltage inner coil 112. Additionally, in some embodiments, the outer coil 114 may be a low-voltage coil and the inner coil 112 may be a high-voltage coil. More generally, a coil assembly may include a first, inner coil and second, outer coil (e.g., concentrically arranged) or single coil. In some embodiments, the first, inner coil may be a low-voltage coil and the second, outer coil may be a high-voltage coil, while in other embodiments, the first, inner coil may be a high-voltage coil and the second, outer coil may be a low-voltage coil. Either or both of the inner and outer coils may have a conductive shield and/or a loop separator region as described herein.

Figure 5A:
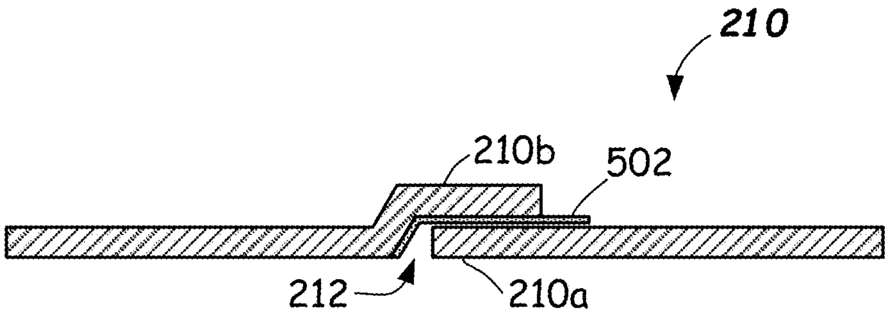
FIG. 5A illustrates a partial cross-sectional side view of a portion of the conductive shield of FIG. 3A in which the conductive shield overlaps itself in accordance with embodiments provided herein.

In some embodiments, the conductive shield may be configured to overlap itself while maintaining a loop separator region. Such an arrangement may be used, for example, in very high electric field applications. FIG. 5A illustrates a partial cross-sectional side view of a portion of the conductive shield 210 of FIG. 3A in which the conductive shield 210 overlaps itself in accordance with embodiments provided herein. With reference to FIG. 5A, an insulating material 502, such as an insulating foil, may be placed over a first portion 210*a* of conductive shield 210 so that a second portion 210*b* of conductive shield 210 overlaps the first portion 210*a*. For example, in the embodiment of FIG. 3A in which the conductive shield 210 is a conductive paint, the first portion 210*a* of conductive shield 210 may be applied, and the insulating material 502 may be positioned over the first portion 210*a* of conductive shield 210 prior to application of the second portion 210*b* of the conductive shield 210. A gap (e.g., loop separator region 212) may be maintained. In some embodiments, a spacer material or mesh (not shown) may be employed, in addition to or in place of the insulating material 502, to allow subsequent insulating material (e.g., resin) applied to the conductive shield 210 to enter and insulate between the first portion 210*a* and second portion 210*b* of conductive shield 210. In one or more embodiments, the first portion 210*a* may overlap the second portion 210*b* of conductive shield 210 by about 8-12 mm, although other overlap amounts may be used. Example insulating materials include polyurethane, polyester, silicone, and the like.

Figure 5B:
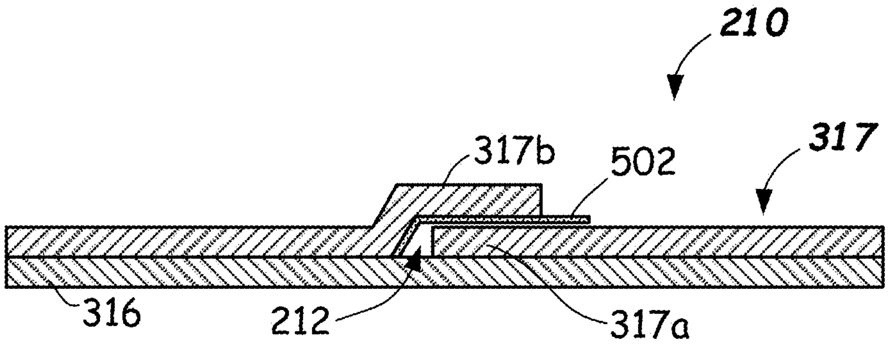
FIG. 5B illustrates a partial cross-sectional side view of a portion of the conductive shield of FIG. 3B in which the conductive shield overlaps itself in accordance with embodiments provided herein.
Figure 5C:
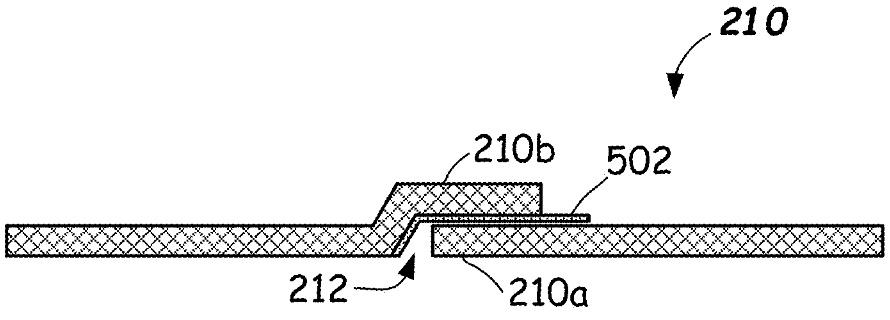
FIG. 5C illustrates a partial cross-sectional side view of a portion of the conductive shield of FIG. 3C in which the conductive shield overlaps itself in accordance with embodiments provided herein.

A similar overlap in conductive shield 210 may be employed when conductive shield 210 includes an underlying semi-conductive paint layer (FIG. 3B) or when conductive shield 210 includes a conductive mesh (FIG. 3C). For example, FIG. 5B illustrates a partial cross-sectional side view of a portion of the conductive shield 210 of FIG. 3B in which the conductive shield 210 overlaps itself and FIG. 5C illustrates a partial cross-sectional side view of a portion of the conductive shield 210 of FIG. 3C in which the conductive shield 210 overlaps itself in accordance with embodiments provided herein. In the embodiment of FIG. 5B, a first portion 317*a* of conductive paint 317 overlies the layer of semi-conductive paint 316 and underlies insulating material 502 and a second portion 317*b* of conductive paint 317 while maintaining a gap (e.g., loop separator region 212). Likewise, in the embodiment of FIG. 5C, a first portion 210*a* of conductive shield 210 underlies insulating material 502 and a second portion 210*b* of conductive shield 210 while maintaining a gap (e.g., loop separator region 212).

While the present disclosure is described primarily with regard to submersible dry-type transformers, it will be understood that the disclosed conductive shields may also be employed with other types of transformers or coil assemblies, such as inductors.

The foregoing description discloses only example embodiments. Modifications of the above-disclosed assemblies and methods which fall within the scope of this disclosure will be readily apparent to those of ordinary skill in the art. For example, although the examples discussed above are illustrated for dry-type transformers, other embodiments in accordance with this disclosure may be implemented for other devices. This disclosure is not intended to limit the invention to the particular assemblies and/or methods disclosed, but, to the contrary, the intention is to cover all modifications, equivalents, and alternatives falling within the scope of the claims.

What is claimed is:

1. A shielded coil assembly, comprising:

a coil having an outer surface, an inner surface, an upper end surface and a lower end surface and a first insulating material formed over the outer surface, inner surface, upper end surface and lower end surface of the coil; and a conductive shield comprising a conductive paint applied along the first insulating material so that the conductive paint extends over at least a portion of each of the outer surface, inner surface, upper end surface, and lower end surface of the coil;

wherein the conductive paint includes a loop separator region having an interruption in the conductive paint along the outer surface, inner surface, upper end surface, and lower end surface of the coil;

wherein the loop separator region comprises a gap in the conductive paint that extends around the outer surface, inner surface, upper end surface, and lower end surface of the coil to form an open loop in the conductive paint;

wherein the shielded coil assembly further comprises a semi-conductive paint comprising an electrical resistance of 1 kilo-ohm/sq in/mil to 10 kilo-ohm/sq in/mil applied directly to a surface of the first insulating material, the conductive paint applied directly to a surface of the semi-conductive paint.

2. The shielded coil assembly of claim 1, further comprising a second insulating material formed over the conductive shield.

3. The shielded coil assembly of claim 2, wherein the first and second insulating material include an epoxy resin.

4. The shielded coil assembly of claim 1, further comprising a grounding cable connected to the conductive shield.

5. The shielded coil assembly of claim 1, further comprising an additional coil positioned concentrically with respect to the shielded coil.

6. The shielded coil assembly of claim 1, wherein the conductive paint comprises a conductive metal including one or more of copper, nickel, silver-coated copper, nickel-silver, and silver.

7. The shielded coil assembly of claim 1, wherein the conductive paint has a resistance of less than 1 Ohm/sq in/mil, or the conductive paint has a thickness in a range from 30 microns to 500 microns.

8. A dry-type transformer comprising:

a core region; and the shielded coil assembly of claim 1 formed around a portion of the core region.

* * * * *